United States Patent [19]

Advani et al.

[11] Patent Number: 4,473,310

[45] Date of Patent: Sep. 25, 1984

[54] THRUST BEARING ASSEMBLIES

[75] Inventors: Suren Advani, Newcastle Upon Tyne; Sydney Farrell, Rowlands Gill, both of England

[73] Assignee: Vickers Public Limited Company, Newcastle Upon Tyne, England

[21] Appl. No.: 437,295

[22] Filed: Oct. 28, 1982

[30] Foreign Application Priority Data

Nov. 2, 1981 [GB] United Kingdom ............... 8132986

[51] Int. Cl.³ .................. F16C 17/00; F16C 17/06
[52] U.S. Cl. ............................... 384/308; 384/304; 384/306
[58] Field of Search ............... 384/303, 302, 304–312, 384/121, 122, 124, 154, 156, 420–427

[56] References Cited

U.S. PATENT DOCUMENTS

| | | | |
|---|---|---|---|
| 3,160,450 | 12/1964 | Gentiluomo | 384/308 |
| 3,197,264 | 7/1965 | Hill | 384/306 |
| 3,586,401 | 6/1971 | Gravelle | 384/308 |
| 3,912,344 | 10/1975 | McCafferty | 384/304 |
| 4,026,613 | 5/1977 | Moravchik | 384/308 |

FOREIGN PATENT DOCUMENTS

| | | |
|---|---|---|
| 66533 | 4/1969 | German Democratic Rep. . |
| 822399 | 10/1959 | United Kingdom ............... 384/303 |
| 1004733 | 9/1965 | United Kingdom . |
| 1041881 | 9/1966 | United Kingdom ............... 384/303 |
| 1055838 | 1/1967 | United Kingdom . |

*Primary Examiner*—Stuart S. Levy
*Assistant Examiner*—Thomas R. Hannon
*Attorney, Agent, or Firm*—Merchant, Gould, Smith, Edell, Welter & Schmidt

[57] ABSTRACT

A thrust bearing assembly includes a carrier member having formed therein an annular slot, a plurality of bearing members, which may be thrust pads or guide members, being received within the slot. Each bearing member has a radially outer surface and an opposed radially inner surface, two spaced regions of the radially outer surface making bearing contact with the associated radially outer sidewall of the annular slot, and a region of the radially inner surface of the bearing member making bearing contact with the associated radially inner sidewall of the annular slot. The bearing contacts prevent, for each bearing member in the carrier member, both radial movement and rotational movement about an axis through the bearing member, and are such that the bearing members are capable of being fitted into slots within a wide range of curvatures.

7 Claims, 9 Drawing Figures

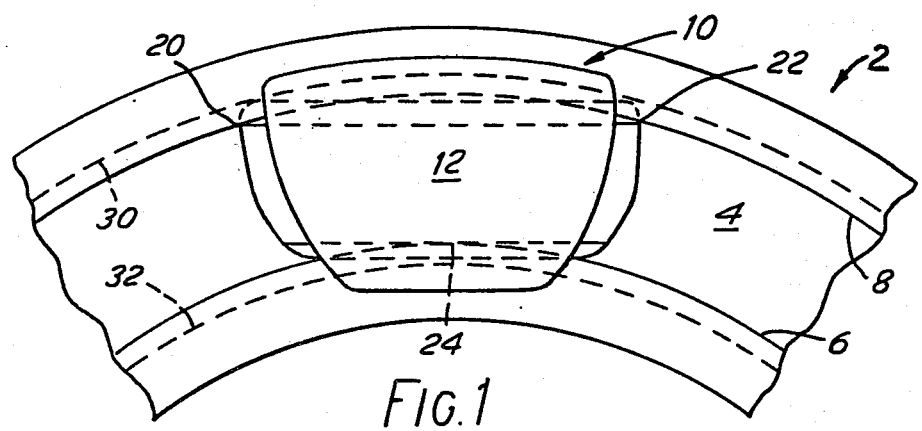
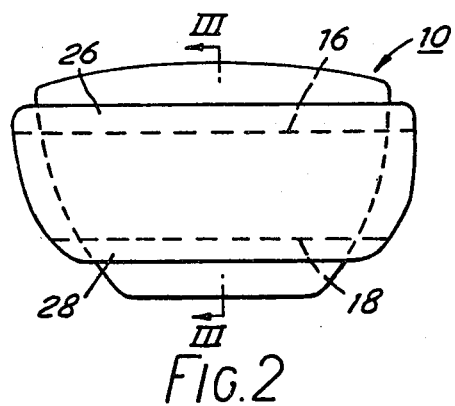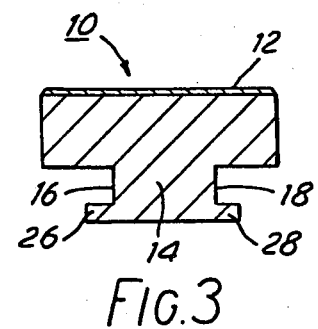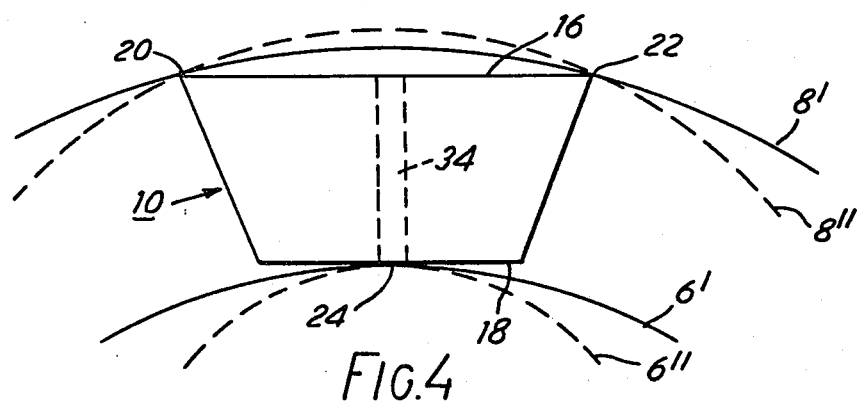

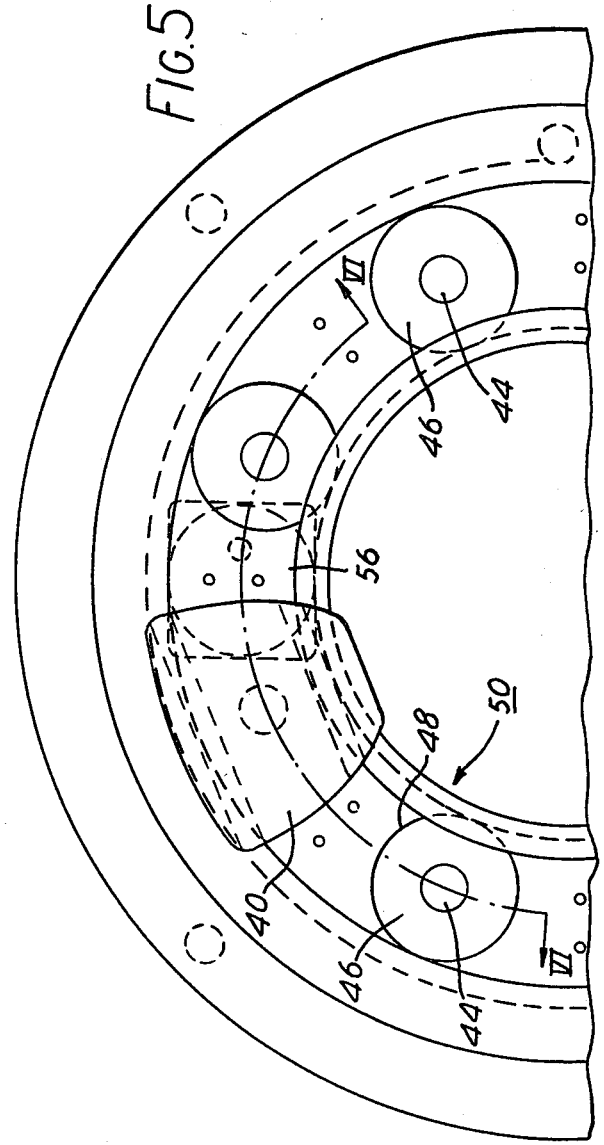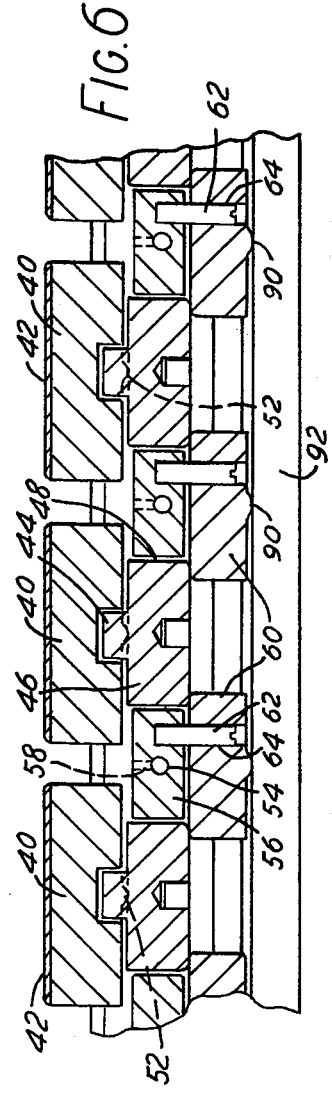

THRUST BEARING ASSEMBLIES

BACKGROUND OF THE INVENTION

This invention relates to thrust bearing assemblies and in particular to such assemblies including a carrier member in which is supported a circular array of bearing members.

In a first known type of thrust bearing assembly, a circular array of thrust pads is supported in a carrier member to absorb axial loads, said carrier member having an annular slot formed therein. Each thrust pad is provided with a pair of opposed surfaces of curvatures conforming exactly with those of the inner and outer sides of the annular slot respectively and spaced apart by the width of said slot, whereby, on location of a thrust pad in the slot, said pad is accurately positioned relative to the carrier member with the bearing surface thereof available to receive associated loads thereon.

With such an arrangement it will be appreciated that, for a carrier member with an annular slot of any given curvature, particular, accurately machined thrust pads will be required, with the result that large stocks of thrust pads with differently curved guide surfaces have to be kept to replace as necessary worn pads on the large range of differently sized thrust bearing assemblies that currently exist.

In a further known type of bearing assembly, a circular array of thrust pads is again supported in a carrier member to absorb axial loads, but the rear surface of each thrust pad engages with, to be supported by, a pair of guide members, which guide members themselves are received within, to be located by, an annular slot formed in a carrier member substantially as detailed for the thrust pads of the above described assembly.

In such assemblies it is well-established practice to support the thrust pads on a self-levelling system for spreading the applied axial load more evenly over the plurality of thrust pads. Such a self-levelling system may typically comprise a circular array of supporting levers each of which co-operates with an associated pair of guide members, one to each side of and below the lever. The guide members, as mentioned above, are located in an annular slot formed in the associated carrier member, with the radially inner and outer surfaces of said guide members having curvatures conforming exactly with those of the inner and outer sides respectively of the slot.

Thus, again, carrier members with given slot curvatures require particular guide members.

Clearly it would be desirable if a universal bearing member, in the first example of the prior art a universal thrust pad and in the further example of the prior art a universal guide member, appropriate to bearing assemblies having carrier members provided with annular slots with a range of curvatures could be provided.

SUMMARY OF THE INVENTION

According to the present invention there is provided a thrust bearing assembly comprising a carrier member in which is formed an annular slot having upstanding radially inner and radially outer sidewalls, and a plurality of bearing members each having a portion for location in said slot, said portion of each bearing member including a radially outer surface, two spaced regions of which make bearing contact with the radially outer sidewall of the slot, and an opposed radially inner surface one region of which makes bearing contact with the radially inner sidewall of the slot, said bearing contacts being such as to prevent, for each bearing member relative to the carrier member, both radial movement and rotational movement about an axis through the bearing member.

It will be appreciated that, for a substantially predetermined width of slot, the bearing members detailed above can be fitted into slots within a very wide range of curvatures, said regions of contact of the bearing member with the sidewalls of the slot being the same regardless of said curvature.

Clearly the bearing members may comprise thrust pads for assemblies similar to that described first above, or may comprise guide members for assemblies similar to the further example above.

In a preferred assembly, the opposed inner and outer surfaces of the portion of the bearing member to be received within the slot are substantially linear and substantially parallel with one another to extend substantially perpendicular to the slot radius, the two end regions of the outer surface of said portion bearing against the radially outer sidewall of the slot and the central region of the inner surface of said portion bearing against the radially inner sidewall of the slot.

Conveniently the opposed sidewalls of the slot in the carrier member each include an annular groove therein, while the opposed surfaces of the portion of the bearing member to be received in the slot each have formed thereon a projection adapted to be received in the groove in the associated sidewall of the slot in such a manner as to prevent axial removal of the bearing member from the carrier member.

In one embodiment of the invention, each bearing member comprises a thrust pad the upper or outer surface of which is adapted to receive directly thereon an applied load, while the lower surface of the thrust pad may have a ridge formed thereon extending radially of the annular slot and engaging the base of said slot to permit limited pivoting of the thrust pad about said ridge relative to the carrier member.

In an alternative embodiment of the invention, each bearing member comprises a guide member, the associated assembly further comprising a plurality of cylindrical levers positioned within corresponding apertures in the carrier member, the rear surface of each lever bearing against two adjacent guide members, and a plurality of thrust pads one mounted on each cylindrical lever.

Conveniently the guide members each include a ridge formed on the lower surface thereof remote from the associated levers and extending radially of the annular slot for engagement with a surface fixed relative to the carrrier member to permit limited pivoting of the guide members about said ridges relative to the carrier member, while the lower surface of each thrust pad may also have formed thereon a ridge extending radially of the annular slot for engagement with the surface of the adjacent lever to permit limited pivoting of the thrust pads about said ridges relative to the levers.

BRIEF DESCRIPTION OF THE DRAWINGS

FIG. 1 is a plan view from above of part of a first thrust bearing assembly according to the invention;

FIG. 2 is a plan view from below of a thrust pad of the assembly of FIG. 1;

FIG. 3 is a vertical section on the line III—III of FIG. 2;

FIG. 4 illustrates diagrammatically how a thrust pad as shown in FIGS. 1 to 3 can be used in conjunction with carrier members incorporating annular slots of different curvatures;

FIG. 5 is a plan view from above of a further thrust bearing assembly according to the invention;

FIG. 6 is a section along the line VI—VI of FIG. 5.

DESCRIPTION OF THE PREFERRED EMBODIMENTS

Figure 7:
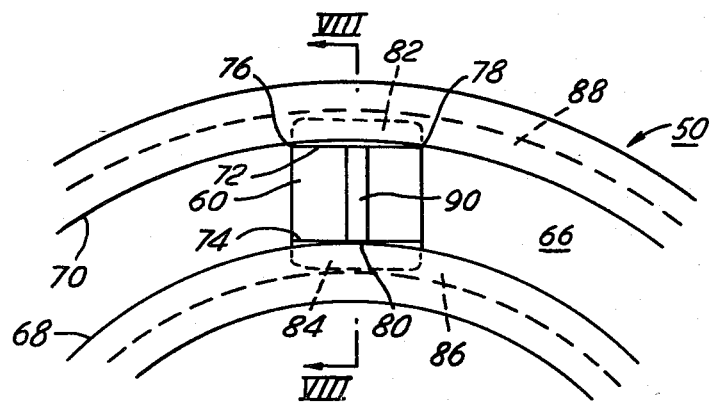
FIG. 7 is plan view from below of part of an assembly similar to that of FIGS. 5 and 6.

Referring to FIGS. 1 to 3, the illustrated first thrust bearing assembly includes a circular carrier 2 in the upper surface of which is formed an annular slot 4 having upstanding radially inner and radially outer sidewalls 6,8 respectively.

Supported on the carrier 2 is a circular array of thrust pads of which one is shown generally at 10. Each pad comprises a substantially sector-shaped metal component the front surface 12 of which provides an anti-friction surface typically coated with a thin layer of, for example, white-metal alloy. The opposed sides of the pad are recessed to provide a guide portion 14 to the pad formed with an opposed pair of linear, parallel guide surfaces 16,18 extending perpendicularly to the front surface 12 of the pad and inwardly of the bounding edges of said front surface.

In use, the guide portion 14 of each pad is located in the slot 4 of the carrier 2, the dimensions of the pad 10 being chosen such that the end regions of the radially outer guide surface 16 contact the sidewall 8 of the slot at the two points 20,22, while the central region of the radially inner guide surface 18 contacts the sidewall 6 of the slot at the point 24. Such a three-point contact of the guide portion 14 of each pad with the slot 4 secures said pad against both radial and rotational movement relative to the carrier 2.

It will be appreciated that a degree of variation from linearity and parallelness of the guide surfaces 16,18 can be accepted without departing from the scope of the basic invention.

In order to ensure that, for example, on removing the moving component (not shown) that, in use, is applying an axial load onto the thrust pads, said pads will remain captive in the carrier 2 and not fall out therefrom, the lower region of the guide portion 14 of each pad is provided with a pair of opposed projections 26,28 extending parallel with, but beyond, the surfaces 16,18 as best seen in FIG. 3. The lower regions of the sidewalls 6, 8 of the slot 4 are correspondingly undercut to provide annular receiving grooves 30, 32 for the projections 26,28 respectively.

FIG. 4 shows how the universal thrust pad 10 detailed above can be received within slots 4 of different curvatures. In the case of a slot 4 of relatively small curvature having sidewalls 6',8', the guide surfaces 16,18 of the pad 10 contact said side-walls at the location points 20,22 and 24. As shown, however, the same three points 20, 22,24 are also effective in the case of slot of comparatively high curvature having sidewalls 6", 8". Thus, a single sized universal thrust pad can be used in a range of differently sized bearings provided with carriers incorporating slots with a range of curvatures providing the radial width of the slot is within predetermined tolerances.

The lower surface of each pad 10 may be provided with a ridge thereon, shon schematically at 34 in FIG. 4, extending substantially radially of the slot 4 and engaging with the base of said slot to permit, on application of an axial load to the assembly, limited pivoting of the pads about said ridges.

Referring to FIGS. 5 to 8, there is shown part of a further bearing assembly comprising a circular array of thrust pads some of which are shown generally at 40. Each pad comprises a substantially sector-shaped metal component the front surface 42 of which forms an anti-friction bearing surface conveniently of a whitemetal alloy.

Each thrust pad 40 is located circumferentially in the assembly by means of an upstanding cylindrical peg 44 received within a correspondingly-shaped opening in the under surface of the pad 40, said peg 44 being formed on a cylindrical supporting lever 46 positioned within a correspondingly-shaped aperture 48 formed in a main carrier 50 of the assembly.

As best seen in FIG. 6, a ridge 52 is formed on the lower surface of each pad 40 to extend substantially radially of the carrier 50, each pad 40 bearing against its associated lever 46 by means of said ridge so that, in use, each thrust pad can tilt slightly relative to the associated lever 46 under changing oil pressure distribution across surfaces 42 of the pads 40. Lubricant is supplied to the bearing surfaces 42 through lubricant passages 54 formed through land portions 56 of the carrier 50 between adjacent apertures 48, these passages 54 each debouching via pairs of lubricating ducts 58.

The rear surface of each cylindrical lever 46 bears, at its opposed edges, against each of two adjacent guide members 60 each positioned immediately behind an associated land portion 56 of the carrier 50. The members 60 are each prevented from moving circumferentially by means of a locating peg 62 projecting from the land portion 56 to be received within a bore 64 formed in the guide member 60.

The guide members 60 are each received within an annular slot 66 formed in the rear surface of the carrier 50, said slot having upstanding radially inner and radially outer sidewalls 68,70 respectively.

Figure 8:
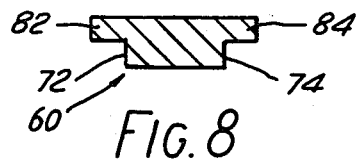
FIG. 8 is a section on the line VIII—VIII of FIG. 7.

As best seen in FIGS. 7 and 8, each guide member 60 is provided with a pair of opposed linear, parallel guide surfaces 72,74 recessed with respect to the bounding edges of the surfaces of the member 60, although variation from linearity and parallelness can be accepted.

With the guide members 60 located in the slot 66 of the carrier 50, the two end regions of the surface 72 of each member 60 make contact with the radially outer sidewall 70 of the slot 66 at points 76,78, while the central region of the surface 74 of each member 60 contacts the radially inner sidewall 68 of said slot at point 80 to provide a three point radial location of each guide member 60 in the carrier 50 to prevent relative radial and rotational movement of said members and carrier.

Each guide member 60 is provided with a pair of opposed projections 82,84 extending parallel with, but outwardly of the surfaces 72,74 as best seen in FIG. 8, while the sidewalls 68,70 of the slot 66 are undercut to provide a pair of annular grooves 86,88 therein respectively. The projections 82,84 of each member 60 are received within the grooves 88,86 respectively to prevent inadvertent axial removal of the guide members 60 from the carrier 50.

Each guide member 60 has a protruding ridge 90 formed on its undersurface to extend substantially radially of the carrier 50, said ridges bearing against a surface of a spacer ring 92 forming part of the bearing assembly. A small amount of free play exists between each guide member 60 and the spacer 92 such as to permit limited pivoting of a guide member 60 on its ridge 90 and relative to the spacer ring 92.

In operation of the further bearing assembly of FIGS. 5 to 8, axial loads acting on the shaft (not shown) rotating in the assembly are applied by way of a thrust collar (not shown) on said shaft against the bearing surface 42 of the pads 40 which absorb said axial loading. If the loading on any one thrust pad 40 is greater than that on the two adjacent pads, the excess loading is transmitted from said pad through the corresponding cylindrical supporting lever 46 therebelow to the associated pair of guide members 60. The guide members 60 pivot on their ridges 90 under the applied load and urge the two cylindrical supporting levers 46, one to each side of the first-mentioned lever supporting the excessively loaded pad 40, in a direction opposite to that of said applied load. This results in a self-levelling action of the adjacent thrust pads such as to reduce the loading on the pad 40 previously subjected to overloading and to transfer the excess thrust to said two adjacent pads. Clearly this load-equalising effect can spread around the entire circular array of pads whereby an axial load is applied substantially equally amongst said array of pads.

Figure 9:
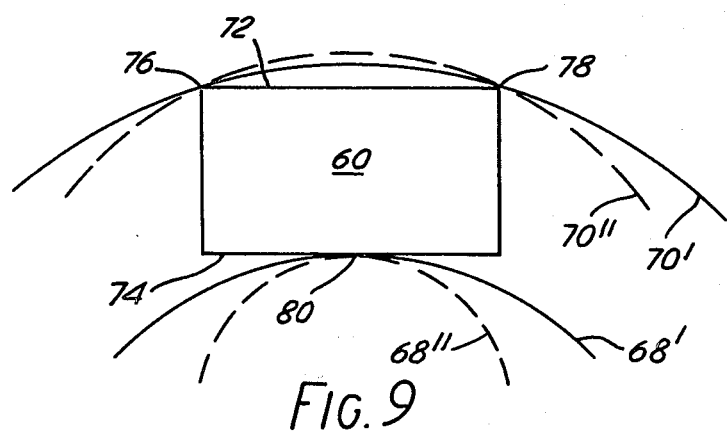
FIG. 9 illustrates diagrammatically how a guide member of an assembly such as that of FIGS. 5 and 6 can be used in conjunction with carrier members incorporating annular slots of different curvatures.

In a similar manner to FIG. 4, FIG. 9 illustrates how a universal guide member 60 can be received within slots 66 of different curvatures. In the case of an annular slot of realtively small curvature having sidewalls 68',70', the surfaces 72,74 of the member 60 contact sidewalls at the locations points 76,78,80. As shown, however, the same three points are also effective in the case of a slot of comparatively high curvature having sidewalls 68",70". Thus a single-sized universal guide member 60 can be used in a range of differently-sized bearings provided with carriers 50 incorporating slots 66 with a range of curvatures providing the radial width of the slot is within predetermined tolerances.

What we claim and desire to secure by Letters Patent is:

1. A thrust bearing assembly comprising a carrier member defining therein an annular slot having upstanding radially inner and radially outer sidewalls, and a plurality of bearing members each including a portion for location in said slot, said portion of each bearing member including a radially outer surface having two spaced regions which make bearing contact with the radially outer sidewall of the slot, and an opposed radially inner surface having one region which makes bearing contact with the radially inner sidewall of the slot, said bearing contacts being such as to prevent, for each bearing member relative to the carrier member, both radial movement and rotational movement about an axis through the bearing member.

2. A thrust bearing assembly as claimed in claim 1 in which the opposed inner and outer surfaces of the portion of each bearing member to be received within the slot are substantially linear and substantially parallel with one another to extend substantially perpendicular to the slot radius, the two end regions of the outer surface of said portion bearing against the radially outer sidewall of the slot and the central region of the inner surface of said portion bearing against the radially inner sidewall of the slot.

3. A thrust bearing assembly as claimed in claim 1 in which the opposed sidewalls of the slot in the carrier member each define therein an annular groove, a projection being formed on each of the opposed surfaces of the portion of the bearing member to be received in the slot, said projections being received in the grooves in the associated sidewalls of the slot in such a manner as to prevent axial removal of the bearing member from the carrier member.

4. A thrust bearing assembly as claimed in claim 1 in which each bearing member comprises a thrust pad the outer surface of which is adapted to receive directly thereon an applied load, a ridge being formed on the lower surface of each thrust pad to extend radially of the annular slot and engage the base of said slot to permit limited pivoting of the thrust pad about said ridge relative to the carrier member.

5. A thrust bearing assembly as claimed in claim 1 in which each bearing member comprises a guide member, the assembly further comprising a plurality of apertures defined in the carrier member in each of which is positioned a corresponding lever, the rear surface of each lever bearing against two adjacent guide members, and a plurality of thrust pads one mounted on each lever.

6. A thrust bearing assembly as claimed in claim 5, a ridge being formed on the lower surface of each guide member remote from the associated lever to extend radially of the annular slot for engagement with a surface fixed relative to the carrier member to permit limited pivoting of the guide members about said ridges relative to the carrier member.

7. A thrust bearing assembly as claimed in claim 6, a ridge being formed on the lower surface of each thrust pad to extend radially of the annular slot for engagement with the surface of the adjacent lever to permit limited pivoting of the thrust pads about said ridges relative to the levers.

* * * * *